United States Patent [19]
Naoumenko et al.

[11] Patent Number: 5,895,721
[45] Date of Patent: Apr. 20, 1999

[54] LAMINATED GLASS AND PRIMER USED FOR ITS PRODUCTION

[75] Inventors: Yves Naoumenko, Bray En Val, France; Karin Broering, Aachen, Germany; Ingrid Vaverka, Aachen, Germany; Udo Gelderie, Aachen, Germany

[73] Assignee: Saint-Gobain Vitrage, Courbevoie, France

[21] Appl. No.: 08/613,940

[22] Filed: Mar. 13, 1996

[30] Foreign Application Priority Data

Jan. 19, 1996 [FR] France ................... 96 00577

[51] Int. Cl.$^6$ ......................................... B32B 17/10
[52] U.S. Cl. ................... 428/429; 428/428; 428/441; 428/442
[58] Field of Search .......................... 428/426, 428, 428/429, 441, 442

[56] References Cited

U.S. PATENT DOCUMENTS

| | | | |
|---|---|---|---|
| 4,619,973 | 10/1986 | Smith, Jr. ................ | 525/329.9 |
| 4,732,944 | 3/1988 | Smith, Jr. ................ | 525/329.9 |
| 4,906,703 | 3/1990 | Bolton et al. ............. | 525/329.9 |
| 5,393,611 | 2/1995 | Flamme .................... | 428/450 |

FOREIGN PATENT DOCUMENTS

| | | |
|---|---|---|
| 0 191088 | 8/1986 | European Pat. Off. . |
| 0 483087 | 4/1992 | European Pat. Off. . |

*Primary Examiner*—D. S. Nakarani
*Attorney, Agent, or Firm*—Oblon, Spivak, McClelland, Maier & Neustadt, P.C.

[57] ABSTRACT

A glazing made of at least one glass layer and at least one transparent layer of ionomer resin, wherein at least a portion of one face of the at least one transparent layer of ionomer resin is adhered to at least a portion of one face of another layer of the glazing using at least one metal chelate, preferably a metal chelate based primer composition, and the primer composition for use in such a glazing are described, to provide laminated glazings which have improved chock resistance, good optical properties, improved resistance to lamination even during cutting operations, and is economical to produce.

25 Claims, No Drawings

LAMINATED GLASS AND PRIMER USED FOR ITS PRODUCTION

BACKGROUND OF THE INVENTION

1. Field of the Invention

The present invention relates to a laminated glass (glazing) comprising at least one layer (sheet) of transparent glass and at least one transparent layer (sheet) of ionomer resin, where one of these layers is at least partly coated with a primer, and the primer used to make the glazing.

2. Discussion of the Background

Laminated glasses are frequently used in the building industry and in the transportation industry as glass having "protection security" characteristics and for reducing the probabilities of breakage and accidents by shock. One conventional example of laminated glass particularly resistant to shock, is a laminated glass containing at least one layer of glass and at least one layer of polycarbonate. However, those glasses have significant problems in adhering the polycarbonate onto the glass or cracking (due to the difference between thermal expansion coefficients) when the glass and the polycarbonates are directly connected. One method to remedy those problems, has been to insert between the glass and the polycarbonate at least one layer of polyurethane. However, the use of such material considerably increases the cost of the product.

Another less expensive laminated glass used in the same type of applications contains a layer of glass and a transparent layer of ionomer resin. Such a laminated glass has been described in the patents EP-191,088, U.S. Pat. No. 4,619,873, U.S. Pat. No. 4,732,944, U.S. Pat. No. 4,906,703 and EP-483,087. In order to increase the adhesion between the glass and the layer of ionomer resin, it is known to prime the glass' surface with a coupling agent, such as a silane, organic amine (aliphatic amine, ethanolamine . . . ) or diisocyanate, before applying the layer of ionomer resin. However, these coupling agents can sometimes be insufficient to provide adequate adhesion between the glass and ionomer resin, with delamination possibly occurring during processing such as cutting operations of the obtained laminated glazing. Thus, there is a need to further increase the adhesion between the ionomer resin layers and the substrates, notably the glass substrates, which are associated with them in the laminated glazings.

SUMMARY OF THE INVENTION

Accordingly, one object of the present invention is to provide an improved laminated glazing, having good properties of chock resistance, good optical properties and an accrued resistance to delamination.

A further object of the present invention is to provide such a laminated glazing which is also economical.

These and other objects of the present invention have been satisfied by the discussion of a laminated glazing having at least one layer of glass and at least one transparent layer of ionomer resin adhered thereto, wherein the layer of ionomer resin is adhered to another layer of the glazing at at least a portion of the surfaces in contact with one another, wherein the adhesion is performed with the use of at least one metal chelate, and a primer comprising such a metal chelate for use in the laminated glazing.

DETAILED DESCRIPTION OF THE PREFERRED EMBODIMENTS

In the present invention, the expression "ionomer resin" means a resin that can be extruded and that contains ethylene/carboxylic acid or alpha olefin/carboxylic acid copolymers, those polymers being crosslinked by ionic reaction. This type of resin has been previously described in patents EP-483,087, EP-191,088, U.S. Pat. No. 4,619,973, U.S. Pat. No. 4,732,944 and U.S. Pat. No. 4,906,703, the relevant portions of which are hereby incorporated by reference. As a preferred ionomer resin, one can use resins based on ionically crosslinked copolymers obtained by combination of ethylene, styrene, or propylene monomers with monomers of acrylic acid, methacrylic acid or maleic anhydride. The one or more ionomer resins used in the laminated glazing according to the invention are preferably made of (meth)acrylic acid (where "(meth)acrylic" refers to either methacrylic or acrylic)/ethylene (or alpha olefin) copolymer(s), crosslinked by ionic reaction. The ionomer resins available commercially usually contain the previously mentioned acidic copolymers, partially neutralized or not, or metallic or amino salts of the mentioned acidic copolymers (one can notably find zinc or sodium ionomers).

The ionomer resin layers can be prepared by conventional means such as by casting or extrusion. Several glazing structures according to the invention are possible such as the structures described in patents EP-0,191,088 or EP-0,483,087 which are hereby incorporated by reference. The glazing according to the present invention can therefore contain one or several glass layers, each glass layer being optionally coated with one or several thin layers which affect optical or energy properties of the glazing, such as the transmission of energy or light. The glazing also contains one or several ionomer resin layers and, optionally, one or several layers of one or several other plastic materials conventionally used in laminated glass, such as polyurethane, polycarbonate, polymethylmethacrylate or another acrylic plastic or polyvinylbutyral. The ionomer resins adhere more or less well to the other plastic materials that can be used to make the laminated glazing, and if desired or needed, can be co-extruded with the mentioned materials. Preferably, each layer of the ionomer resin of the glazing according to the present invention is placed between two glass layers or two plastic layers or between one glass layer and one plastic layer.

The chelate used according to the invention to improve the adhesion between the layer of ionomer resin and at least one adjacent layer, notably a glass layer or another plastic layer, can intervene in different forms in the laminated glazing. In particular it can be part of a primer used to coat at least a portion of at least one face of the ionomer resin layer and/or at least a portion of at least one adjacent layer, notably a glass layer (provided or not with thin layers which affect optical or energy properties), before assembling of the two layers. It can also be incorporated in the composition of one of the layers, notably into a layer of the ionomer resin, in order to make it self-adhesive.

The metal chelate used according to the present invention can be any metal chelate, for example a titanium, zirconium, chromium chelate, and is preferably a titanium chelate. The substituents (or ligands) of that chelate are generally groups having an alkoxy functionality linked to the chelate central metal atom. Preferably at least one of the substituents has at least one additional second atom having one or more pairs of free electrons, such as a nitrogen, oxygen or sulfur atom. Preferred substituents for the present metal chelate include: triethanolamine, acetylacetonate, octyleneglycol, isopropoxyl and butoxyl . . . Most preferably, the present chelate used is a metal chelate having at least one (most preferably two) acetylacetonate group(s) and having at least one (most preferably two) alkoxy group(s) (notably $C_1$–$C_4$ alkoxy group(s), such as propoxyl or butoxyl). Most preferred chelates include diisopropoxy-bis [facetylacetonate] titanium or isopropoxy butoxy-bis[tacetylacetonate] titanium (those products being simply designated by "titanium acetylacetonate").

The use of the present chelate to improve the adhesion between the layer(s) of ionomer resin and at least one of the adjacent layers within the laminated glazing allows the laminated glazing to have an increased resistance to delamination over time. This resistance is particularly advantageous in instances where the laminated glazing is of large dimensions and is meant to be sawed. Any delamination during the sawing is thus eliminated in the glazing according to the present invention.

The resistance to delamination of glazing according to the invention due to the improved adhesion between the resin layer(s) and the adjacent layer(s) is notably characterized by a value of at least 3 Pummel units, when the glazing is submitted to the Pummel test, described below in the Examples, whereas the resistance to delamination of laminated glazing using a primer based on one or several silanes does not usually exceed 1 Pummel unit. In most cases, the resistance to delamination of the glazing according to the present invention is at least 5 Pummel units.

In addition to significantly improved resistance to delamination, the glazing according to the present invention has good resistance to shock, good rigidity, minimal projection of particles upon breakage, good optical properties, can be easily and economically made and can be used to make glazings for use in numerous types of applications. By contrast, the polycarbonate and polyurethane type glazings are less easy and more expensive to make and are not suitable to certain types of applications, such as the fabrication of windshields.

The glazing according to the present invention is obtained according to processes well known to one of ordinary skill in the art, notably by assembly of the different layers of the glazing under heat and pressure. The chelate used can be synthesized using conventional well-known procedures from the corresponding metal chloride by reaction in alcohol or acetylacetone, the reaction optionally being followed by a trans-esterification. In addition, some chelates are also commercially available.

In order to make the laminated glazing according to the present invention, one preferably uses a primer containing the chelate according to the present invention. This primer can be applied to the layer of ionomer resin using a roller immediately following the extrusion operation or can be applied or pulverized subsequently, on the layer of ionomer resin or on another layer that must come in contact with the layer of ionomer resin.

This primer contains at least one chelate as previously mentioned and at least one solvent capable of dissolving the chelate such as an alcohol, notably isopropanol. Since the chelate solution is relatively stable, the primer can be stored for some days before application. The use of such a chelate solution also allows an application on the layers to be glued, with the solvent being easily eliminated, for example by drying, before the assembly of the primed layer with the layer that must be joined by the primer.

One can also use as the chelate solvent mixtures of water-alcohol in ratios allowing a clear solution to be obtained (preferably mixtures of at least 50% weight of alcohol).

In one advantageous embodiment of the present invention, the one or more chelates used to improve the adhesion in the laminated glass are used in conjunction with at least one silane, preferably one epoxysilane such as a gamma glycidoxy-propyl-trimethoxy-silane. The combination of at least one chelate and one silane allows, in certain cases, the results obtained using only the chelate to be further improved. When a primer containing at least one chelate and at least one silane is used, this primer preferably uses a solvent mixture of water and chelate solvent, for example a mixture of water-alcohol, preferably a mixture of water-isopropanol.

The primer according to the present invention contains preferably 0.05 to 3% by weight of the metal chelate (based on total primer weight) and 95 to 99.95% by weight (based on total primer weight) of a water-alcohol mixture containing 50 to 100% alcohol (based on total weight of water-alcohol mixture). The primer can also contain a silane in an amount between 0 and 3% by weight, the ratio between the amounts of silane and chelate being preferably from 0.33 to 3, with the primer containing at least 1%, preferably 5% by weight of water. The dry extract of the primer is from 0.05 to 5% by weight and is preferably less than 3% by weight.

Having generally described this invention, a further understanding can be obtained by reference to certain specific examples which are provided herein for purposes of illustration only and are not intended to be limiting unless otherwise specified.

EXAMPLES

EXAMPLE 1

A laminated glazing in accordance with the present invention was prepared as follows: a layer of ionomer resin composed of ethylene-methacrylate copolymers was obtained by extrusion and then placed in between two identical glass layers, wherein the faces of the glass layers in contact with the ionomer resin layer were previously coated with a primer and dried. The pile of layers was then calendered before the final assembly under heat and pressure.

A Pummel test was done on samples of the laminated glazing obtained, the test having the following steps:

The samples were placed in a freezer at $-18°$ C. for at least two hours. The samples were then removed and hammered using an electromagnetic hammer, within seconds following their removal from the freezer. Each sample was progressively hammered at increments of 10 mm wide and 15 mm height compared to the lower side (edge) of the sample, with the sample being inclined at 5 to $10°$.

When the lower edge had been totally pulverized, the next 15 mm were hammered. This process was repeated until 10 cm of the sample had been pulverized. It is important to ensure that all the glass on the two faces was pulverized.

The samples to be tested were then brought to ambient temperature and left a time sufficient to allow any condensed humidity to evaporate before the evaluation was continued.

The samples were compared to "Pummel" standards, to observe whether the standards or the samples have more resin without glass. This procedure was repeated until an agreement was obtained between standards and samples.

The sample was turned and retested as just described.

The Pummel test was considered good when the observed values were in the range of 3 to 8 Pummel units (preferably 3 to 6 for automobile applications and 5 to 8 for architectural applications). One cannot exceed, preferably, 8 Pummel units in order to keep certain properties such as the glazing's resistance to shocks. With less than 3 Pummel units, risks of delamination can appear with time.

In the present example, the primer used was titanium acetylacetonate (added as a 75 wt % solution, available as TiACA 75 by the HULS company) and isopropanol based. The weight composition of the primer is given in Table 1 as well as the value obtained from the Pummel test.

EXAMPLES 2,3,4,5,6

In these examples, the primer used in Example 1 was replaced by respectively each one of the primers described in Table 1. The results are given in Table 1. The silane used was a gamma glycidoxy-propyl-trimethoxy-silane available as SILQUEST A 187 by OSi.

REFERENCE EXAMPLE

In this example, the primer used in Example 1 was replaced by a primer that contained no chelate, but contained a conventional aminosilane primer available as SILQUEST A 1100 by OSi. The composition of this primer and the results obtained are given in Table 1.

One can observe an improvement of the adhesion using a primer that has a chelate base according to the present invention. The glazing according to the invention also has an increased resistance to delamination.

The laminated glazing according to the invention can be used in a variety of end uses such as in the construction industry, in the automobile industry to make, for example, armored vehicles, glazing for jails or banks, etc . . .

TABLE 1

|  | TiACA (in g) | SI-LANE A187 (in g) | WATER (in g) | ISO-PRO-PANOL (in g) | SI-LANE A1100 | PUMMEL VALUES |
| --- | --- | --- | --- | --- | --- | --- |
| Example 1 | 1.33 |  |  | 98.7 |  | 5 |
| Example 2 | 1.33 |  | 10 | 88.7 |  | 5 |
| Example 3 | 0.13 | 0.3 |  | 99.6 |  | 5 |
| Example 4 | 0.67 | 1.5 |  | 97.8 |  | 6 |
| Example 5 | 0.13 | 0.3 | 10 | 89.6 |  | 7 |
| Example 6 | 0.67 | 1.5 | 10 | 86.8 |  | 7 |
| Ref. Ex. |  |  | 49.5 | 49.5 | 1 | 0–1 |

This application is based on French Patent Application 96/00577, filed with the French Patent Office on Jan. 19, 1996, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A glazing, comprising:
   at least one glass layer; and
   at least one transparent layer of ionomer of either an ethylene/carboxylic acid copolymer or an alpha olefin/carboxylic acid copolymer,
   wherein at least a portion of one face of one of said at least one transparent layer of ionomer resin is adhered to at least a portion of one face of at least one of said at least one glass layer using at least one metal chelate.

2. The glazing according to claim 1, wherein the at least one metal chelate is a titanium chelate.

3. The glazing according to claim 2, wherein the at least one metal chelate is a titanium acetylacetonate.

4. The glazing according to claim 1, wherein the at least one metal chelate is used in combination with γ-glycidoxy propyl-trimethoxy silane.

5. The glazing according to claim 1, wherein the at least one metal chelate is part of a primer, wherein said primer is applied on at least a portion of at least one face of the layer of ionomer resin, on at least a portion of at least one layer to come in contact with said layer of ionomer resin in the glazing or both.

6. The glazing according to claim 1, further comprising at least one layer of a thermoplastic material selected from the group consisting of polyurethane, polycarbonate, an acrylic plastic and polyvinylbutyral which is different from said ionomer resin.

7. The glazing according to claim 1, wherein said at least one metal chelate is a compound having a metal selected from the group consisting of titanium, zirconium and chromium and wherein said metal has at least one alkoxy ligand.

8. The glazing according to claim 7, wherein said at least one metal chelate further contains at least one substituent having at least two atoms having one or more pairs of free electrons capable of chelation.

9. The glazing according to claim 8, wherein said at least one substituent having at least two atoms having one or more free electrons is a member selected from the group consisting of triethanolamine, acetylacetonate and octyleneglycol.

10. The glazing according to claim 1, wherein said at least one metal chelate is selected from diisopropoxy-bis (acetylacetonate) titanium or isopropoxy butoxy-bis (acetylacetonate) titanium.

11. The glazing according to claim 1, wherein said ethylene/carboxylic acid copolymer or alpha olefin/carboxylic acid copolymer is ionically crosslinked.

12. The glazing according to claim 1, herein said ethylene/carboxylic acid copolymer or alpha olefinicarboxylic acid copolymer is comprised of at least one monomer unit selected from the group consisting of ethylene, propylene and styrene and at least one monomer unit selected from the group consisting of acrylic acid, methacrylic acid and maleic anhydride.

13. The glazing according to claim 1, wherein said ethyleneicarboxylic acid copolymer comprises ethylene monomer units and at least one monomer unit selected from the group consisting of acrylic acid and methacrylic acid.

14. The glazing according to claim 1, further comprising at least one thermoplastic layer.

15. The glazing according to claim 1, produced by a process comprising adhering, with said at least one metal chelate, at least a portion of one face of one of said at least one transparent layer of ionomer resin to at least a portion of one face of at least one of said at least one glass layer.

16. A glazing, comprising:
   at least one glass layer;
   at least one transparent layer of ionomer of either an ethylene/carboxylic acid copolymer or an alpha olefin/carboxylic acid copolymer; and
   at least one thermoplastic layer,
   wherein at least a portion of one face of said at least one transparent layer of ionomer resin is adhered to at least a portion of one face of said at least one thermoplastic layer using at least one metal chelate.

17. The glazing according to claim 16, wherein said at least one metal chelate is used in combination with γ-glycidoxy propyl trimethoxy-silane.

18. The glazing according to claim 16, wherein said at least one metal chelate is a titanium chelate.

19. The glazing according to claim 18, wherein said at least one metal chelate is a titanium acetylacetonate.

20. The glazing according to claim 16, wherein said at least one metal chelate is part of a primer, wherein said primer is applied on at least a portion of at least one face of the layer of ionomer resin, on at least a portion of at least one layer to come in contact with said layer of ionomer resin in the glazing or both.

21. The glazing according to claim 16, further comprising at least one layer of a thermoplastic material selected from the group consisting of polyurethane, polycarbonate, an acrylic plastic and polyvinylbutyral which is different from said ionomer resin.

22. The glazing according to claim 16, wherein said at least one metal chelate is a compound having a metal selected from the group consisting of titanium, zirconium and chromium and wherein said metal has at least one alkoxy ligand.

23. The glazing according to claim 22, wherein said at least one metal chelate further contains at least one substituent having at least two atoms having one or more pairs of free electrons capable of chelation.

24. The glazing according to claim 23, wherein said at least one substituent having at least two atoms having one or more free electrons is a member selected from the group consisting of triethanolamine, acetylacetonate and octyleneglycol.

25. The glazing according to claim 16, wherein said at least one metal chelate is diisopropoxy-bis(acetylacetonate) titanium or isopropoxy butoxy-bis(acetylacetonate) titanium.

* * * * *